June 15, 1926.
T. C. MANCHESTER
PROCESS OF TREATING MILK
Filed March 16, 1922
1,589,192
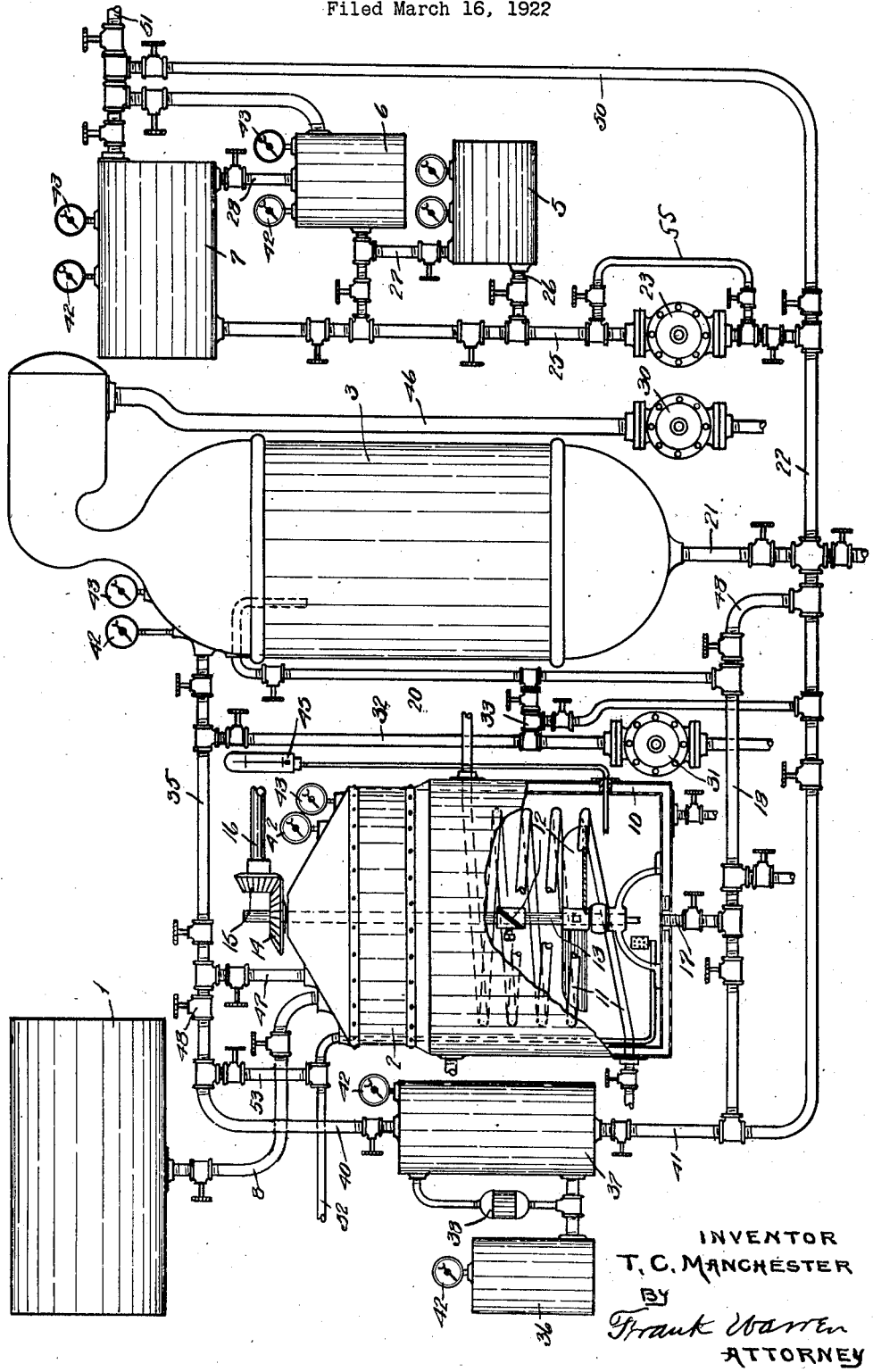
INVENTOR
T. C. MANCHESTER
BY
Frank Warren
ATTORNEY Patented June 15, 1926.

1,589,192

UNITED STATES PATENT OFFICE.

THEODORE C. MANCHESTER, OF KENT, WASHINGTON.

PROCESS OF TREATING MILK.

Application filed March 16, 1922. Serial No. 544,123.

My invention relates to an improved process of preserving the vitamin content of milk and other foods and the object of my invention is to provide a process that will protect and preserve the vitamin content of milk and other foods during the process of preparing the same for bottling or canning or for use whereby the product will contain the vitamin content that was originally contained therein.

The accompanying drawings is a view in side elevation, somewhat diagrammatic and partly broken away of an apparatus adapted to carry out my novel process.

My invention will be explained in connection with the processes of evaporating and Pasteurizing milk and it will be understood that other food or materials of foods of an analogous character may be treated in a similar manner. Also when reference is made to carbon dioxid gas in the course of the specification it is understood that other non-oxidizing and inert gas may be used in place thereof if found more available or advantageous for any reasons.

Referring to the drawings, the reference numeral 1 indicates a tank for storage of milk or other material, 2 is a closed container for freeing the milk of air and for heating and agitating the milk and 3 is a vacuum pan in which the milk is reduced, 5 indicates a homogenizing machine, 6 a cooling device and 7 a closed storage tank. The milk flows from the tank 1 to the container 2 through pipe 8 when the milk and container 2 is freed of air which air is replaced by carbon-dioxide gas and the milk is then heated through a steam jacket 10 and a steam pipe coil 11. The milk is stirred by means of paddles 12 on shaft 13 which is rotated through bevel gear 14 driven by bevel pinion 15 on power driven shaft 16. Milk from said container is drawn off through connection pipe 17 into pipe 18 whence it flows through pipe 20 into the vacuum pan 3. 21 indicates a connection between the vacuum pan 3 and a pipe 22 which leads to a pump 23 through which the milk from said pan 3 flows to the homogenizing machine 5 through pipe 25 and connection 26 and thence through a short pipe 27 to the cooler 6 and finally through pipe 28 to the storage tank 7. The vacuum pan is provided with an exhauster or vacuum pump 30 and another vacuum pump 31 is adapted for communication connection therewith through pipe 32 and connection 33 with pipe 20 or through pipe 32 and pipe 35.

Numeral 36 indicates a tank for the storage of gas, such as carbon dioxide ($CO_2$) or an equivalent non-oxidizing, inert gas, under relatively high pressure, and 37 is a low pressure supply tank for the system, while 38 indicates an automatic pressure controlling device adapted to admit the passage of gas from the tank 36 to the tank 37 as the same is exhausted from the latter. The pipe 40 makes communication connection between the tank 37 and the pipe 35 and the pipe 41 similarly connects the tank with pipes 18 and 22. Numerous valves are positioned in the pipe lines when necessary or advantageous and will be referred to particularly as the description proceeds.

The pressure gauges are indicated by numerals 42 and vacuum gauges by numerals 43. A thermometer for closed container 2 is indicated at 45.

Having thus briefly described the apparatus utilized in carrying out my invention I will proceed to describe my improved process. Presuming with the fact that the vitamin contents of milk or other foods are rapidly oxidized and destroyed when subjected to heat in the presence of air and even without heat the presence of air is destructive to the vitamin contents of the food, though not to the same degree. In my process I exhaust and exclude the air from all the apparatus where air would normally be found and introduce in place thereof a gas, such as carbon-dioxid which is inert and not destructive to the vitamins contained in the milk. It is in the removal of the air in the food material within the apparatus and from within the apparatus itself and the substitution therefor of such a gas as cited previous to the application of any heat that the vital part of my invention consists.

In the evaporator or vacuum pan 3 the milk will enter practically free from air. The gas which has been added thereto will enter the pan 3 and be exhausted through the pump 30 and pipe 46, otherwise the process of evaporation will be carried on as usual. When the milk is drawn from the pan 3 the gas is allowed to enter in place thereof to fill the vacuum held therein.

The particular function of the pump 31 is to effect the exhaustion of the air from the pipes and apparatus containing the milk except pan 3 and connection. Prior to the milk entering the pan 3 the milk is allowed to flow from the supply tank 1 to the closed container 2 through pipe 8. The milk is then treated as follows to remove all included air: The container is exhausted of air through the pump 31 then the agitator is started and the carbon-dioxide gas from the tank 37 is allowed to flow into the material through the pipe 40 and connection 53 thence through the pipe 52 and attached spray nozzle. The process of vacuum exhaustion agitation and flow of carbon-dioxide gas are then continued simultaneously for a sufficient length of time to liberate and remove all included air from the milk and the container. The vacuum is then turned off and carbon-dioxide gas is allowed to enter the container to fill the vacuum therein.

Having freed the milk of air and having removed the air from the container and having substituted carbon-dioxide gas therefor I am now ready to start heating the milk in the inert gaseous container. Whatever heat treatment is necessary to forewarming, Pasteurize or sterilize the milk may now be given without danger of oxidation of the vitamin content as the material is air free and in an atmosphere of inert, non-oxidizing gas.

The pipe 18 which conducts the milk from the container 2 to the pan 3 is supplied with gas through pipe 41 as is also the pipe 22 through which the milk is conveyed away from the pan 3 through the medium of the pump 23 to the storage tank 7 and is maintained in an air free condition.

To further protect the milk permanently from air, the bottles, cans or other containers may be exhausted of air and the vacuum thus formed filled with carbon-dioxide gas previous to filling the same with the milk.

When the milk is treated to a Pasteurizing or sterilizing process but not evaporated I have provided means to flow the milk through certain portions of the apparatus without passing through the vacuum pan 3 for example, the milk may flow from the container 2 after having received the desired treatment therein through pipes 17 and 18 through a short connection 48 into pipe 22 whence it is conducted through pump 23 and pipe 25 to homogenizer 5 and thence through the cooler 6 either to the closed storage tank 7 or to the canning or bottling machine or other point of delivery. As another example after reaching pump 23 the milk may be passed through pipe 25 to the cooler 6 and from thence either to the closed storage tank 7 or to the canning or bottling machine or other point of delivery.

In the event that the material is not to be either cooled, stored or homogenized previous to the canning or bottling of the same, it may be conducted through pipe 50 from pipe 22 to the outlet pipe 51 which goes to the canning or bottling machine. In any event all operations are conducted in apparatus which have been exhausted of air and filled with carbon-dioxide gas as heretofore described.

Provision is also made for entering live steam into the container 2 through the pipe 52 and attached spray nozzle when it is necessary or desired.

A by-pass shown as at 55 serves to pass the vacuum or carbon-dioxide gas around the pump 23 in exhausting and charging the apparatus 5, 6 and 7 therebeyond.

Having described my invention what I claim is:

1. A process of preserving the vitamin content of milk which consists in introducing the milk into a container then exhausting the air contained in said milk and said container, then introducing inert non-oxidizing gas within said container and then heating said milk to Pasteurize or forewarm the same.

2. A process of preserving the vitamin content of milk consisting in introducing the milk into a container, exhausting the air within said container and simultaneously exhausting by agitation the air contained in said milk, then instantly introducing inert non-oxidizing gas within said container and heating said milk.

In witness whereof, I hereunto subscribe my name this 4th day of March A. D. 1922.

THEODORE C. MANCHESTER.